(12) United States Patent
Labarthe et al.

(10) Patent No.: US 11,142,327 B2
(45) Date of Patent: Oct. 12, 2021

(54) AIRCRAFT TURBOMACHINE ASSEMBLY COMPRISING AN ARTICULATED COWL

(71) Applicant: Airbus Operations SAS, Toulouse (FR)

(72) Inventors: Christophe Labarthe, Buzet sur Tarn (FR); Jean Geliot, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 179 days.

(21) Appl. No.: 16/658,936

(22) Filed: Oct. 21, 2019

(65) Prior Publication Data

US 2020/0122850 A1    Apr. 23, 2020

(30) Foreign Application Priority Data

Oct. 23, 2018 (FR) ...................................... 1871281

(51) Int. Cl.
| | |
|---|---|
| *B64D 29/08* | (2006.01) |
| *B64D 29/06* | (2006.01) |
| *B64D 29/02* | (2006.01) |
| *B64D 27/26* | (2006.01) |

(52) U.S. Cl.
CPC ............. *B64D 29/06* (2013.01); *B64D 29/02* (2013.01); *B64D 29/08* (2013.01); *B64D 27/26* (2013.01)

(58) Field of Classification Search
CPC ........ B64D 27/26; B64D 29/02; B64D 29/06; B64D 29/08
See application file for complete search history.

(56) References Cited

U.S. PATENT DOCUMENTS

| | | | | |
|---|---|---|---|---|
| 3,164,956 A | * | 1/1965 | Colebrook | F02K 1/56 239/265.37 |
| 4,697,763 A | * | 10/1987 | Vermilye | B64D 29/06 244/129.4 |
| 5,775,639 A | * | 7/1998 | Fage | F02K 1/60 244/110 B |

(Continued)

FOREIGN PATENT DOCUMENTS

| | | |
|---|---|---|
| DE | 1431143 A1 | 1/1970 |
| FR | 2901245 A1 | 11/2007 |
| FR | 2935354 A1 | 3/2010 |

OTHER PUBLICATIONS

French Search Report; priority document.

*Primary Examiner* — Philip J Bonzell
*Assistant Examiner* — Tye William Abell
(74) *Attorney, Agent, or Firm* — Greer, Burns & Crain, Ltd.

(57) ABSTRACT

A turbomachine assembly comprising a nacelle having an air inlet and comprising a structure. A forward hood is fixed to the structure and extends backwards from the air inlet. An articulated hood is arranged in the upper part of the nacelle and at the rear of the forward hood and comprises a front edge arranged at the front of the articulated hood. A rear edge is arranged at the rear of the articulated hood. A joint is disposed at the front edge between the articulated hood and the structure and ensures a displacement of the articulated hood between a closed position and an open position. A locking system is arranged at the rear edge, and is mobile between a locked position and an unlocked position, where in the closed position, the front edge is under the forward hood.

5 Claims, 3 Drawing Sheets

(56) References Cited

U.S. PATENT DOCUMENTS

| | | | | |
|---|---|---|---|---|
| 6,220,546 B1* | 4/2001 | Klamka | ................ | B64D 29/00 244/129.4 |
| 2007/0278345 A1* | 12/2007 | Oberle | ................... | B64D 29/08 244/53 R |
| 2010/0072324 A1* | 3/2010 | Teulou | ................... | B64D 29/06 244/53 R |

* cited by examiner

AIRCRAFT TURBOMACHINE ASSEMBLY COMPRISING AN ARTICULATED COWL

CROSS-REFERENCES TO RELATED APPLICATIONS

This application claims the benefit of the French patent application No. 1871281 filed on Oct. 23, 2018, the entire disclosures of which are incorporated herein by way of reference.

FIELD OF THE INVENTION

The present invention relates to a turbine engine assembly of an aircraft comprising an articulated cowl, and an aircraft comprising such an assembly.

BACKGROUND OF THE INVENTION

An aircraft conventionally comprises a fuselage, on either side of which is fixed a wing. Each wing supports at least one attachment pylon which, in turn, supports a turbine engine assembly composed of a nacelle and of an engine. The nacelle forms the aerodynamic surface which surrounds the engine.

The attachment pylon is fixed between the structure of the wing and the turbine engine assembly.

Many systems, for example electrical and hydraulic, are arranged at the junction between the attachment pylon and the turbine engine assembly. These systems are concealed by aerodynamic cowls, such as, for example, some of those that form the nacelle.

In particular, a cowl situated in the top part of the nacelle can be removed to access the abovementioned systems and, in particular, the electrical junctions between the attachment pylon and the engine.

Currently, such a cowl is fixed by several fixing screws, and, in the maintenance steps, removing and replacing the cowl take a long time.

SUMMARY OF THE INVENTION

One object of the present invention is to propose a nacelle which comprises an articulated cowl which facilitates access to the systems located at the junction between the attachment pylon and the engine.

To this end, a turbine engine assembly of an aircraft is proposed comprising a nacelle, said nacelle having an air inlet and comprising:

a structure,
an upstream cowl fixed to said structure in order to produce an aerodynamic surface and extending to the rear from the air inlet,
an articulated cowl arranged in the top part of the nacelle and at the rear of the upstream cowl and comprising a front edge arranged at the front of the articulated cowl, a rear edge arranged at the rear of the articulated cowl, an articulation arranged at the front edge and fixed between the articulated cowl and the structure, the articulation ensuring the displacement of the articulated cowl between a closed position in which the articulated cowl is in aerodynamic continuity with other cowls of the nacelle and an open position in which the articulated cowl frees an opening in the nacelle, and
a locking system arranged at the rear edge, and mobile between a locking position in which it blocks the displacement of the rear edge relative to the structure and an unlocking position in which it allows the displacement of the rear edge relative to the structure, in which, in the closed position, the front edge is positioned under the upstream cowl.

Such a nacelle therefore facilitates the work of the technicians, since the articulated cowl can be opened and closed easily and rapidly. Such architecture also avoids the scooping phenomena.

Advantageously, the locking system comprises, on the port side and on the starboard side, a centering plate secured to the structure and pierced by a window and a bolt that is mobile on the structure, the locking system also comprises, for each window, a centering block secured to the articulated cowl and which penetrates into the window in a closed position and exits from the window in an open position, and the locking system also comprises, for each bolt, a strike secured to the articulated cowl into which the bolt penetrates in the closed position and from which it exits in the open position when it is actuated.

Advantageously, the articulation comprises at least one link on the port side and on the starboard side and at least one cylinder, each of the links and each cylinder have a first end mounted articulated on the structure and a second end mounted articulated on the articulated cowl.

Advantageously, the structure comprises, on the port side and on the starboard side, a spring blade on which the first ends of each link and of each cylinder are mounted articulated.

Advantageously, the turbine engine assembly comprises, on the port side and on the starboard side of the articulated cowl, a shoe fixed under the upstream cowl, each shoe has a slit which emerges on one of the side flanks of the shoe and which is open toward the rear, the turbine engine assembly also comprises, for each slit, a centering block secured to the articulated cowl, and oriented so that, when the articulated cowl passes from the open position to the closed position, each centering block penetrates into the slit, and when the articulated cowl passes from the closed position to the open position, each centering block exits from the slit.

The invention also proposes an aircraft comprising an attachment pylon and a turbine engine assembly according to one of the preceding variants attached to the attachment pylon.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
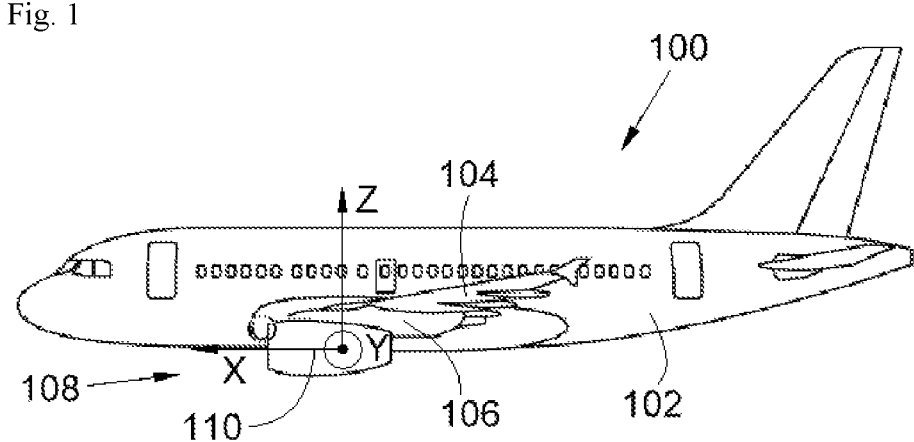
FIG. 1 is a side view of an aircraft according to the invention.

In the following description, the terms relating to a position are taken with reference to a nacelle mounted on an aircraft moving forward, that is to say as is represented in FIG. 1.

FIG. 1 shows an aircraft 100 which comprises a fuselage 102 on either side of which is fixed a wing 104. Under each wing 104 there is fixed an attachment pylon 106 to which is attached a turbine engine assembly 108 composed of a nacelle 110 and of an engine (not represented) surrounded by the nacelle 110.

In the following description, and by convention, X denotes the longitudinal axis of the nacelle 110 oriented positively in the direction of advance of the aircraft 100 and which is also parallel to the longitudinal axis of the aircraft 100, Y denotes the transverse axis of the nacelle 110 which is horizontal when the aircraft 100 is on the ground, and Z denotes the vertical axis or vertical height when the aircraft 100 is on the ground, these three directions X, Y and Z being mutually orthogonal and forming an orthonormal reference frame.

Figure 2:
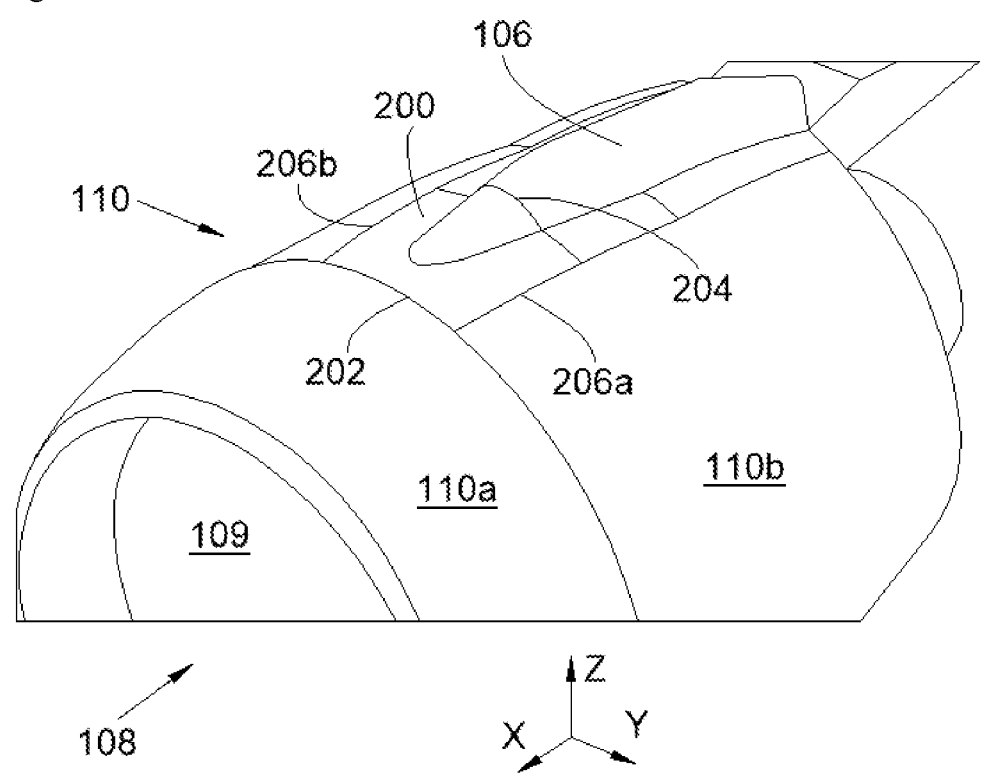
FIG. 2 is a perspective view of a turbine engine assembly according to the invention.

FIG. 2 shows the junction between the turbine engine assembly 108 and the attachment pylon 106. The nacelle 110 comprises a structure (302, FIG. 3) and several cowls (or fairings) 110a-b, 200 which are fixed to the structure 302 in order to produce an aerodynamic surface. As is known, the nacelle 110 comprises an air inlet 109 through which the engine sucks the air necessary to its operation. The nacelle 110 comprises, in particular, in the top part and in front of the attachment pylon 106 (that is to say, between the air inlet 109 and the pylon 106), an articulated cowl 200.

The articulated cowl 200 is positioned at the rear of an upstream cowl 110a which itself extends to the rear from the air inlet 109. The articulated cowl 200 is positioned between lateral cowls 110b.

The articulated cowl 200 comprises four pairwise opposing edges 202, 204 and 206a-b.

The articulated cowl 200 has, more particularly, a front edge 202 which is arranged at the front of the articulated cowl 200 relative to the longitudinal axis X and which is globally parallel to the transverse axis Y.

The articulated cowl 200 has, more particularly, a rear edge 204 which is arranged at the rear of the articulated cowl 200 relative to the longitudinal axis X and which is also globally parallel to the transverse axis Y.

The articulated cowl 200 has, more particularly, two lateral edges 206a-b which are arranged on the port side and on the starboard side of the articulated cowl 200 and which are globally parallel to the longitudinal axis X.

Figure 3:
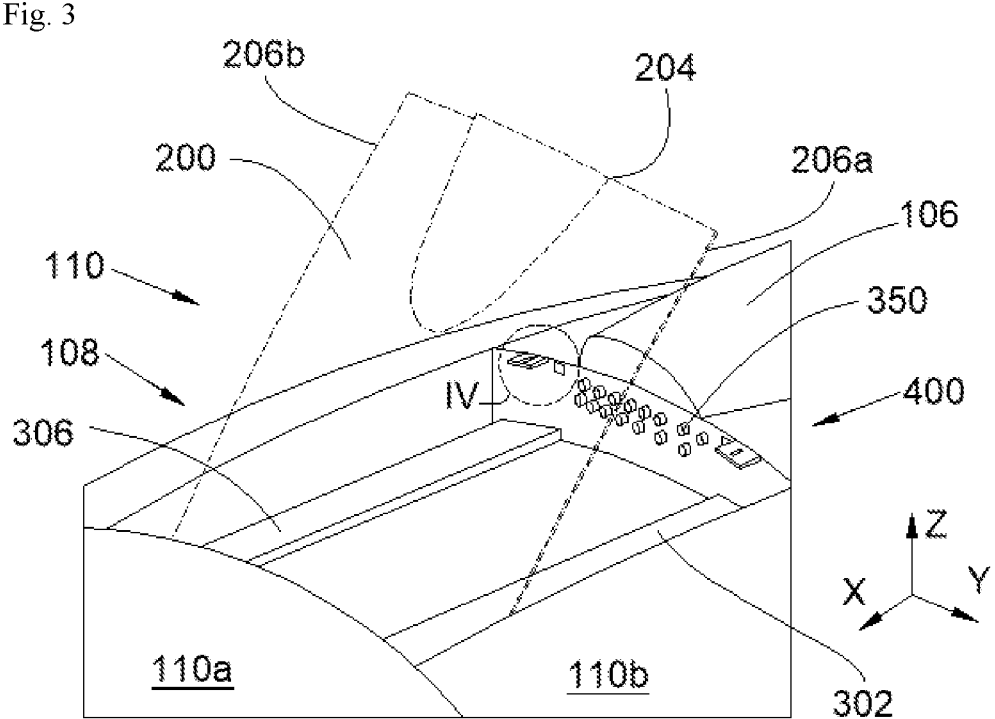
FIG. 3 is a perspective view of a part of a nacelle of the turbine engine assembly of FIG. 2 with an articulated cowl in the open position.

FIG. 2 shows the articulated cowl 200 in a closed position and FIG. 3 shows the articulated cowl 200 in an open position. In FIG. 3, the articulated cowl 200 is shown transparent (fine chain-dotted lines).

The articulated cowl 200 is mounted articulated on the structure 302 of the nacelle 110 between the closed position (FIG. 2) in which the articulated cowl 200 is in aerodynamic continuity with the other cowls 110a-b of the nacelle 110 and the open position (FIG. 3) in which the articulated cowl 200 frees an opening in the nacelle 110 in order to access the interior of the nacelle 110 and in particular the systems of the aircraft 100 which extend between the attachment pylon 106 and the engine such as, in particular, an electrical box 350.

The nacelle 110 comprises an articulation (500, FIG. 5) which is arranged at the front edge 202 and a locking system 400 which is arranged at the rear edge 204.

Figure 5:
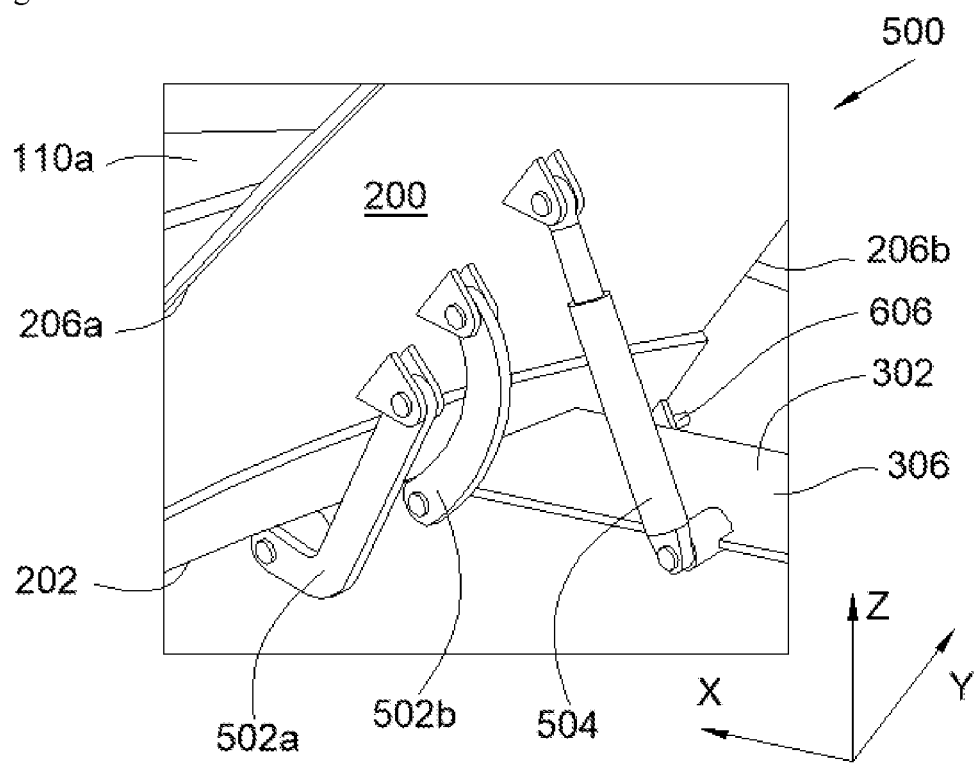
FIG. 5 is a perspective view of an example of articulation of the articulated cowl.

FIG. 5 shows a part of an example of an articulation 500 which is fixed between the articulated cowl 200 and the structure 302 of the nacelle 110 and ensures the displacement of the articulated cowl 200 between the closed position and the open position and vice versa.

Figure 4:
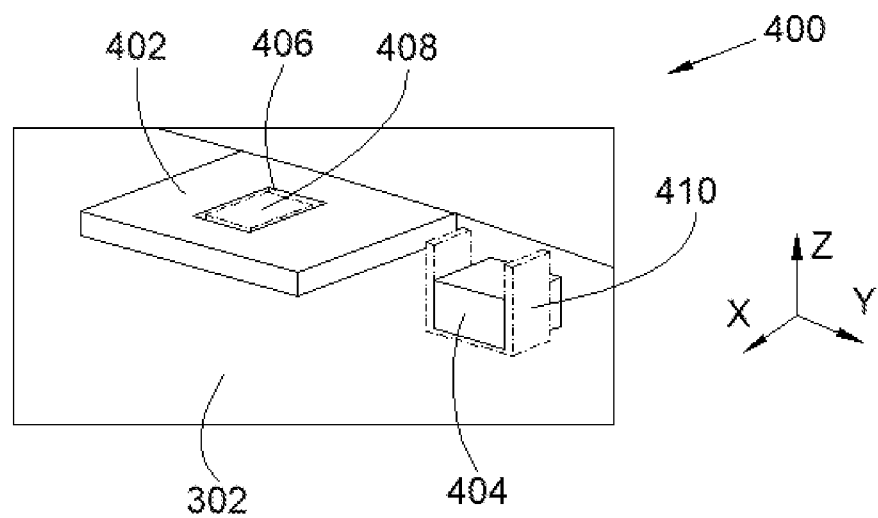
FIG. 4 is a perspective view of the detail IV of FIG. 3 showing a locking system.

FIG. 4 shows a part of an example of a locking system 400. The locking system 400 is mobile between a locking position in which it blocks the displacement of the rear edge 204 relative to the structure 302 of the nacelle 110 and an unlocking position in which it allows the displacement of the rear edge 204 relative to the structure 302 of the nacelle 110. The locking system 400 is actuated by any appropriate means such as, for example, a handle that can be actuated from the outside of the nacelle 110, or such as, for example, an electrical control.

The passage from the closed position to the open position of the articulated cowl 200 is performed by swiveling the articulated cowl 200 about the articulation 500 and by separating the rear edge 204 outward from the nacelle 110.

Such an articulated cowl 200 thus makes it possible to easily and rapidly access the interior of the nacelle 110.

Furthermore, in the closed position, the front edge 202 is positioned under the upstream cowl 110a, thus avoiding the scooping phenomena.

FIG. 4 shows an embodiment of the locking system 400 in which the elements of the articulated cowl 200 are shown transparent (fine chain-dotted lines).

The locking system 400 comprises, on the port side and on the starboard side, a centering plate 402 secured to the structure 302 and extending overall horizontally to the front, and a bolt 404 that can be actuated and that is mobile horizontally on the structure 302. The centering plate 402 is pierced by a window 406 having an axis perpendicular to the plane of the centering plate 402.

The locking system 400 also comprises for each window 406, a centering block 408 secured to the articulated cowl 200 which exits from the window 406 in the open position and penetrates into the window 406 in the closed position, thus ensuring a securing on the longitudinal axis X.

The locking system 400 also comprises, for each bolt 404, a strike 410 secured to the articulated cowl 200 into which the bolt 404 penetrates in the closed position and from which it exits in the open position when it is actuated. In the embodiment of the invention presented here, the bolt 404 is retracted toward the rear to exit from the strike 410.

FIG. 5 shows an articulation 500 according to a particular embodiment of the invention. In FIG. 5, only the starboard side is represented.

The articulation 500 comprises at least one link 502a-b on the port side and on the starboard side and at least one cylinder 504.

Each of the links 502a-b and each cylinder 504 have a first end mounted articulated on the structure 302 and a second end mounted articulated on the articulated cowl 200. The cylinder 504 assists in the opening of the articulated cowl 200 and ensures that it is held in the open position and is, for example, a gas cylinder.

Such an articulation 500 allows for a wide opening of the articulated cowl 200 in order to reach the systems of the aircraft 100.

In order to compensate for the movements between the different elements of the nacelle 110, the structure 302 comprises, on the port side and on the starboard side, a spring blade 306 on which the first ends of each link 502a-b and of each cylinder 504 are mounted articulated.

Figure 6:
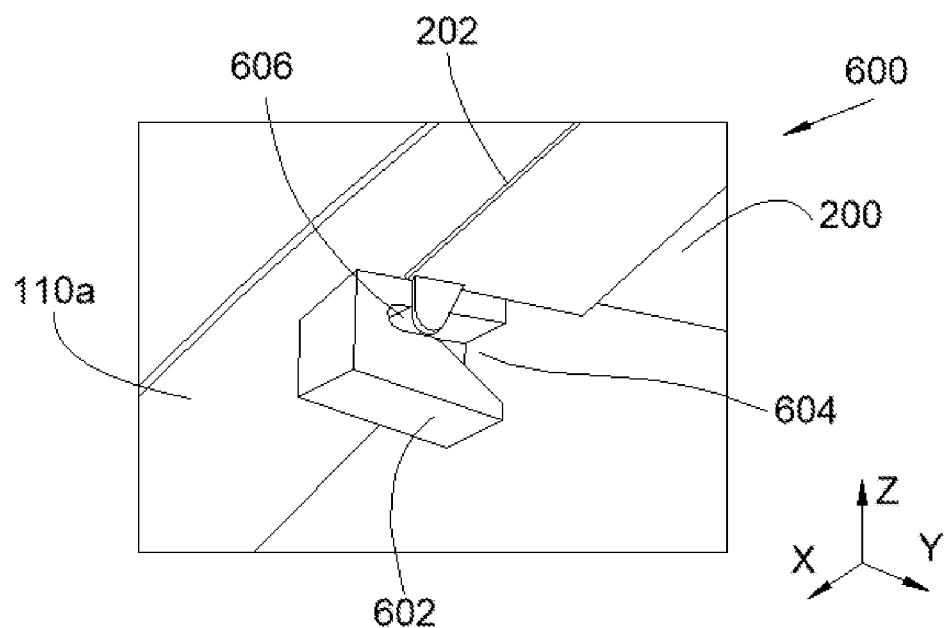
FIG. 6 is a perspective view from the interior of the nacelle of a radial centering system.

FIG. 6 shows the positioning of the front edge 202 of the articulated cowl 200 under the upstream cowl 110a in the closed position.

FIG. 6 also shows a radial centering system 600 which, in the closed position, ensures a centering in the radial direction of the nacelle 110 which is, here, globally vertical.

The radial centering system 600 comprises, on the port side and on the starboard side of the articulated cowl 200, a shoe 602 secured to the structure 302, and, here, more particularly to the upstream cowl 110a. Each shoe 602 is, here, fixed under the upstream cowl 110a.

Each shoe 602 has a slit 604 which emerges on one of the side flanks of the shoe 602 and which is open to the rear. The slit 604 is therefore delimited to the top and to the bottom by the walls of the shoe 602, that is to say, globally on the vertical axis Z.

The radial centering system 600 also comprises, for each slit 604, a centering block 606 which is secured to the articulated cowl 200 and which is oriented here globally parallel to the transverse axis Y, so that when the articulated cowl 200 passes from the open position to the closed position, each centering block 606 penetrates into the slit 604 through the opening at the rear to be held therein. Conversely, when the articulated cowl 200 passes from the closed position to the open position, each centering block 606 exits from the slit 604.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbine engine assembly of an aircraft comprising a nacelle, said nacelle having an air inlet and comprising:
    a structure,
    an upstream cowl fixed to said structure to produce an aerodynamic surface and extending to a rear from the air inlet,
    an articulated cowl arranged in a top part of the nacelle and at a rear of the upstream cowl and comprising a front edge arranged in front of the articulated cowl, a rear edge arranged at a rear of the articulated cowl,
    an articulation arranged at the front edge and fixed between the articulated cowl and the structure, said articulation ensuring a displacement of the articulated cowl between a closed position in which the articulated cowl is in aerodynamic continuity with other cowls of the nacelle and an open position in which the articulated cowl frees an opening in the nacelle, and
    a locking system arranged at a rear edge, and mobile between a locking position in which the locking system blocks a displacement of the rear edge relative to the structure and an unlocking position in which the locking system allows the displacement of the rear edge relative to the structure,
    wherein, in the closed position, the front edge is positioned under the upstream cowl,
        said locking system comprising, on a port side and on a starboard side, a centering plate secured to the structure and pierced by a window and a bolt that is mobile on the structure,
    wherein the locking system also comprises, for each window, a centering block secured to the articulated cowl and which penetrates into the window in the closed position and exits from the window in the open position, and
    wherein the locking system also comprises, for each bolt, a strike secured to the articulated cowl into which the bolt penetrates in the closed position and from which the bolt exits in the open position when the locking system is actuated.

2. The turbine engine assembly according to claim 1, further comprising, on the port side and on the starboard side of the articulated cowl,
    a shoe fixed under the upstream cowl,
    wherein each shoe has a slit which emerges on one of a pair of side flanks of the shoe and which is open toward the rear,
    wherein, for each slit, a centering block secured to the articulated cowl, and oriented so that, when the articulated cowl passes from the open position to the closed position, each centering block penetrates into the slit and, when the articulated cowl passes from the closed position to the open position, each centering block exits from the slit.

3. The turbine engine assembly according to claim 1, wherein the articulation comprises at least one link on the port side and on the starboard side and at least one cylinder, wherein each of the links and each cylinder have a first end mounted articulated on the structure and a second end mounted articulated on the articulated cowl.

4. The turbine engine assembly according to claim 3, wherein the structure comprises, on the port side and on the starboard side, a spring blade on which the first ends of each link and of each cylinder are mounted and articulated.

5. An aircraft comprising an attachment pylon and a turbine engine assembly according to claim 1, attached to said attachment pylon.

* * * * *